US 11,480,864 B2

(12) United States Patent
Yamada et al.

(10) Patent No.: US 11,480,864 B2
(45) Date of Patent: Oct. 25, 2022

(54) REFLECTION-TYPE TRANSPARENT SCREEN, AND IMAGE DISPLAY SYSTEM

(71) Applicant: AGC Inc., Tokyo (JP)

(72) Inventors: Naruki Yamada, Tokyo (JP); Yukihiro Tao, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/238,254

(22) Filed: Apr. 23, 2021

(65) Prior Publication Data

US 2021/0240068 A1   Aug. 5, 2021

Related U.S. Application Data

(63) Continuation of application No. PCT/JP2019/045863, filed on Nov. 22, 2019.

(30) Foreign Application Priority Data

Nov. 26, 2018 (JP) .............................. JP2018-219889

(51) Int. Cl.
    *G03B 21/60*   (2014.01)
    *G03B 21/62*   (2014.01)
    *G02B 27/01*   (2006.01)

(52) U.S. Cl.
    CPC .............. *G03B 21/60* (2013.01); *G02B 27/01* (2013.01); *G03B 21/62* (2013.01)

(58) Field of Classification Search
    CPC ......... G03B 21/60; G03B 21/62; G02B 27/01
    USPC ....................................................... 359/459
    See application file for complete search history.

(56) References Cited

U.S. PATENT DOCUMENTS

| 8,107,165 | B2 * | 1/2012 | Kageyama | G03B 21/60 |
| | | | | 359/459 |
| 9,030,736 | B2 * | 5/2015 | Sadahiro | G03B 21/60 |
| | | | | 359/449 |
| 9,188,847 | B2 * | 11/2015 | Maruta | G03B 21/60 |

(Continued)

FOREIGN PATENT DOCUMENTS

| CN | 104298063 A | 1/2015 | |
| EP | 1605283 A2 * | 12/2005 | ............ G03B 21/602 |

(Continued)

OTHER PUBLICATIONS

International Search Report dated Jan. 28, 2020 in PCT/JP2019/045863 filed on Nov. 22, 2019, 3 pages.

*Primary Examiner* — Christopher E Mahoney
(74) *Attorney, Agent, or Firm* — Oblon, McClelland, Maier & Neustadt, L.L.P.

(57) ABSTRACT

A reflective transparent screen exhibiting high brightness over a wide region in the screen although with a narrow viewing angle, and an image display system is provided. The reflective transparent screen has a first transparent layer 32 having an irregular surface, a reflective layer 40 formed on the irregular surface, and a second transparent layer 52 formed on the irregular surface on which the reflective layer 40 is formed so as to fill irregularities. The irregular surface of the first transparent layer 32 has a slant angle in a first direction being within a range of from −44' to +44', and a slant angle in a second direction perpendicular to the first direction being within a range of from −44' to +44'.

13 Claims, 19 Drawing Sheets

(56) References Cited

U.S. PATENT DOCUMENTS

| | | | |
|---|---|---|---|
| 2016/0011342 A1* | 1/2016 | Griffin | G03B 21/62 |
| | | | 359/459 |
| 2017/0082915 A1 | 3/2017 | Tao et al. | |
| 2018/0074315 A1* | 3/2018 | Yanai | G02F 1/13718 |
| 2020/0233297 A1 | 7/2020 | Yamada et al. | |
| 2020/0271832 A1 | 8/2020 | Yamada et al. | |
| 2021/0072632 A1* | 3/2021 | Tao | B29D 11/00269 |

FOREIGN PATENT DOCUMENTS

| | | | |
|---|---|---|---|
| JP | 2006-501504 A | 1/2006 | |
| JP | 2010-539525 A | 12/2010 | |
| JP | 2018-132600 A | 8/2018 | |
| JP | 2018-146666 A | 9/2018 | |
| WO | WO 2014/041690 A1 | 3/2014 | |
| WO | WO 2015/186668 A1 | 12/2015 | |
| WO | WO 2016/051766 A1 | 4/2016 | |
| WO | WO 2018/131684 A1 | 7/2018 | |

\* cited by examiner

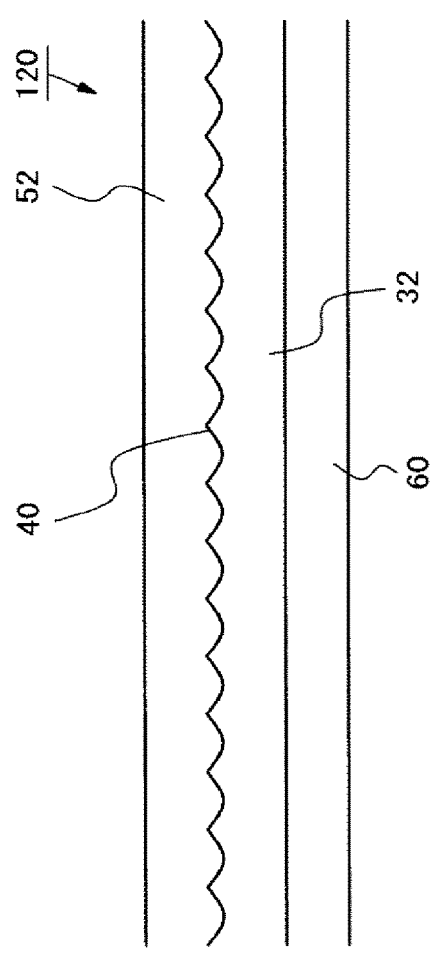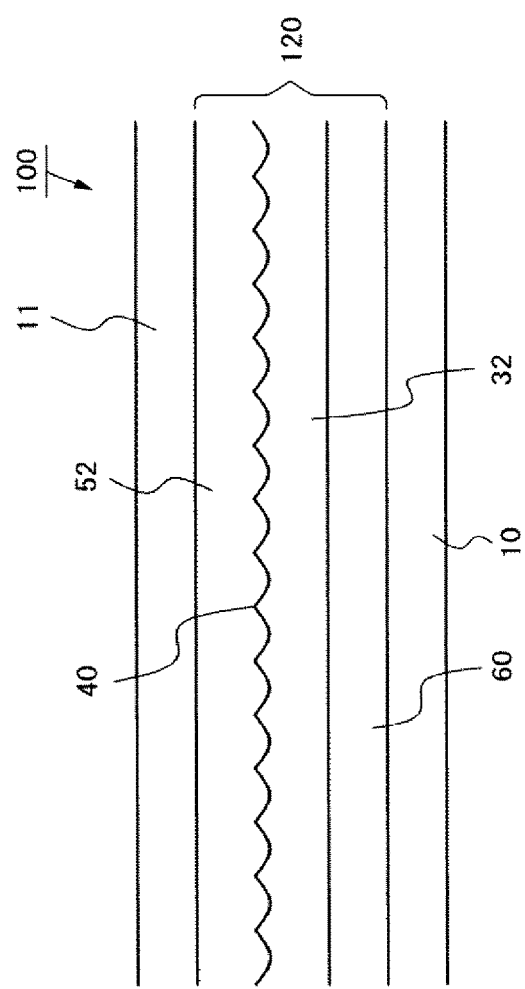
Fig. 7
Fig. 8

(A)        (B)

<Projector disposition positions>

(A)

|  |  | Observer | | | Projector | | |
|---|---|---|---|---|---|---|---|
|  | Position | x | y | z | x | y | z |
| Upper | 1 | 100 | 105 | 25 | 70 | 0 | 35 |
| Upper | 2 | ↑ | ↑ | ↑ | 70 | 70 | 35 |
| Upper | 3 | ↑ | ↑ | ↑ | 70 | 140 | 35 |
| Lower back | 4 | ↑ | ↑ | ↑ | 10 | 0 | 0 |
| Lower back | 5 | ↑ | ↑ | ↑ | 10 | 70 | 0 |
| Lower back | 6 | ↑ | ↑ | ↑ | 10 | 140 | 0 |
| Lower front | 7 | ↑ | ↑ | ↑ | 60 | 0 | 0 |
| Lower front | 8 | ↑ | ↑ | ↑ | 60 | 70 | 0 |
| Lower front | 9 | ↑ | ↑ | ↑ | 60 | 140 | 0 |

(B)

<Vehicle width direction cross sectional view>

(A)

<Front view>

(B)

(A)

(B)

Projector (3)

(A)

(B)

Projector (4)

(A)

(B)

Projector (5)

(A)

(B)

Projector (6)

(A)

(B)

Projector (7)

(A)

(B)

(A)

(B)

Projector (9)

(A)

(B)

REFLECTION-TYPE TRANSPARENT SCREEN, AND IMAGE DISPLAY SYSTEM

TECHNICAL FIELD

The present invention relates to a reflective transparent screen and an image display system.

BACKGROUND ART

As a reflective screen which visibly displays image light projected from a projecting apparatus and which makes an image in the back of the screen visible, one useful for a head-up display (HUD) installed on a windshield of a vehicle may be mentioned (for example, Patent Document 1).

Patent Document 2 discloses a diffusing plate to be used as a screen, on which microlens arrays are arranged. The diffusing plate disclosed in Patent Document 2 is prepared as a transmission diffusing plate or a reflective diffusing plate.

Patent Document 2 discloses to use a microlens array comprising two or more types of microlenses differing in shape, so as to prevent nonuniformity in intensity (nonuniformity in brightness) within a predetermined angle range.

PRIOR ART DOCUMENTS

Patent Document

Patent Document 1: JP-A-2010-539525
Patent Document 2: WO2016/051766

DISCLOSURE OF INVENTION

Technical Problem

In general for a screen, a wide viewing angle is required so that a plurality of observers can view an image. However, for vehicle HUDs, a narrow viewing angle screen is required, since the image should be viewed by a specific few (including one) observers only. The application of the narrow viewing angle screen is not limited to HUDs.

The object of the present invention is to provide a reflective transparent screen with a narrow viewing, exhibiting high brightness over a wide region on the screen, and an image display system.

Solution to Problem

The reflective transparent screen of the present invention comprises:
a first transparent layer having an irregular surface,
a reflective layer formed on the irregular surface, and
a second transparent layer formed on the irregular surface on which the reflective layer is formed, so as to fill irregularities,
the irregular surface of the first transparent layer having a slant angle in a first direction being within a range of from −44° to +44°, and a slant angle in a second direction perpendicular to the first direction being within a range of from −44° to +44°.

Further, the image display system of the present invention comprises the above reflective transparent screen and a projector to project an image on the reflective transparent screen,
wherein the slant angles are changed so that the brightness of reflected light from the reflective transparent screen becomes maximum as viewed by an observer.

Advantageous Effects of Invention

According to the present invention, it is possible to provide a reflective transparent screen with a narrow viewing angle, exhibiting high brightness over a wide region on the screen, and an image display system.

BRIEF DESCRIPTION OF DRAWINGS

FIG. 7 is a cross sectional view illustrating an example of the structure of an image projecting structure.
FIG. 8 is a cross sectional view illustrating an example of the structure of a reflective transparent screen.

DESCRIPTION OF EMBODIMENTS

Now, embodiments of the present invention will be described with reference to drawings. In this specification, based on the reflective transparent screen (hereinafter referred to as the transparent screen), the observer side will be referred to as front side, and the side opposite of the transparent screen from the observer will be referred to as back side.

Figure 1:
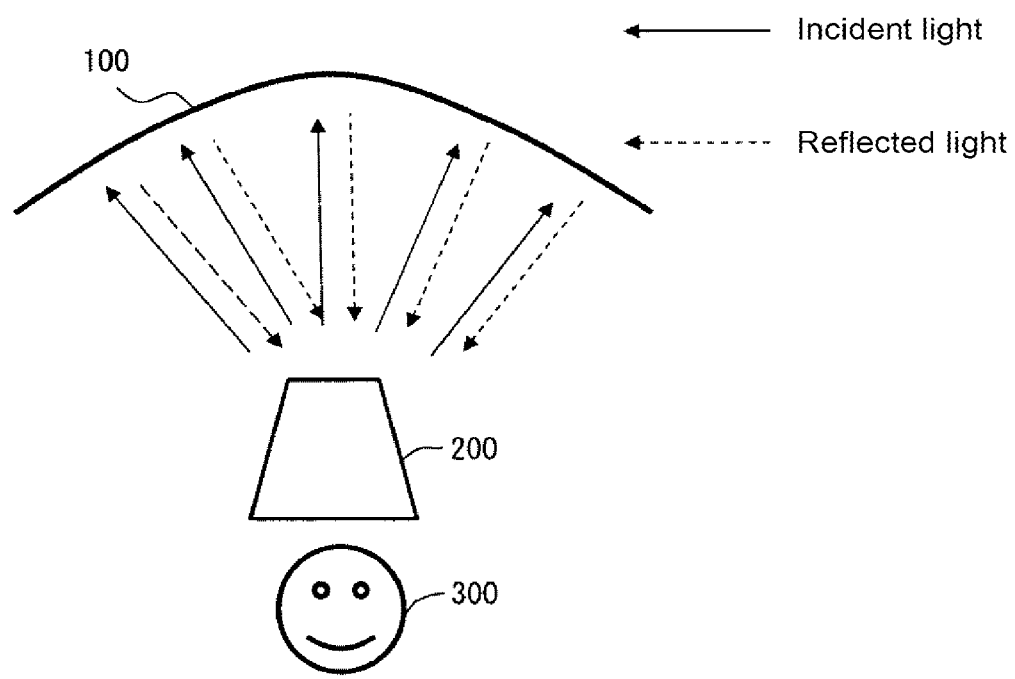
FIG. 1 is a view illustrating a concept of the function of the reflective transparent screen of the present invention.

FIG. 1 is a view illustrating a concept of the function of the reflective transparent screen of the present invention. As shown in FIG. 1, a projector 200 as an example of a projecting apparatus is disposed at a predetermined position on the front side of the transparent screen 100, as an example. As the projector 200, conventional ones may be used. The transparent screen 100 reflects light for images (incident light) from the projector 200. Light (reflected light) from the most of the region (for example, the whole region) on the transparent screen 100 is reflected toward the observer 300. In FIG. 1, the projector 200 and the observer 300 are drawn to be the same level, and in practice, the projector 200 is located above, below, on the left or on the right of the observer 300.

Figure 2:
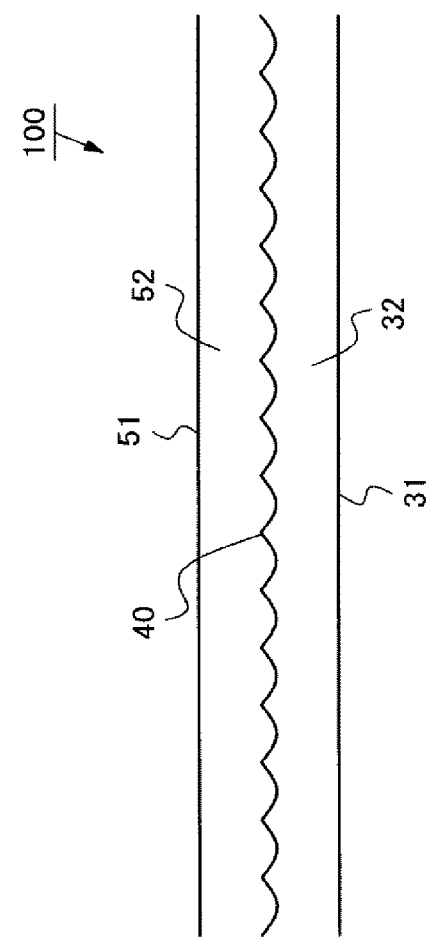
FIG. 2 is a cross sectional view illustrating one cross section of an essential part of the reflective transparent screen.

FIG. 2 illustrates one cross section (cross section in y direction; the height direction is taken as x direction, and the lengthwise direction is taken as the y direction) of an essential part of the reflective transparent screen 100 according to the present embodiment. As shown in FIG. 2, the transparent screen 100 comprises a first transparent layer 32 having irregularities formed on its surface, a reflective layer 40 formed on the surface having irregularities formed on the first transparent layer 32, and a second transparent layer 52 formed on the reflective layer 40. The second transparent layer 52 is formed on the reflective layer 40 so as to fill the irregularities. A surface 51 on the opposite side of the second transparent layer 52 from the reflective layer 40 may be a flat surface or may be a curved surface. Further, the rear side (reference surface) 31 of the first transparent layer 32 may be a flat surface or may be a curved surface.

When the prepared transparent screen 100 is brought into actual use, the second transparent layer 52 is located on the front side, that is on the observer side.

First Embodiment

Figure 3:
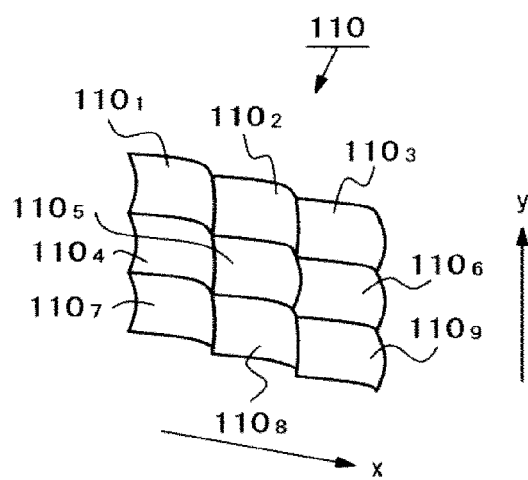
FIG. 3 is an oblique view illustrating a unit lens constituting a part of the reflective transparent screen.

FIG. 3 is an oblique view illustrating a unit lens constituting a part of the reflective transparent screen 100 according to the first embodiment. The shape of the surface of the first transparent layer 32 (corresponding to the shape of the reflective layer 40) of the transparent screen 100 is a shape formed by unit lenses 110 arranged. Specifically, the irregularities on the first transparent layer 32 are realized by the surface shape of a plurality of unit lenses 110. In other words, the surface shape of the reflective layer 40 is realized by the surface shape of a plurality of unit lenses 110, Hereinafter lenses constituting the unit lens 110 may sometimes be referred to as small lenses $110_1$ to $110_9$.

FIG. 3 illustrates a unit lens 110 containing 3×3 (=9) small lenses $110_1$ to $110_9$. Further, FIG. 3 illustrates small lenses $110_1$ to $110_9$ having a rectangular shape as observed from the front (in a plan view), however, the shape of the small lenses is not limited to rectangular, and may be triangular or more polygonal or may be circular.

Figure 4:
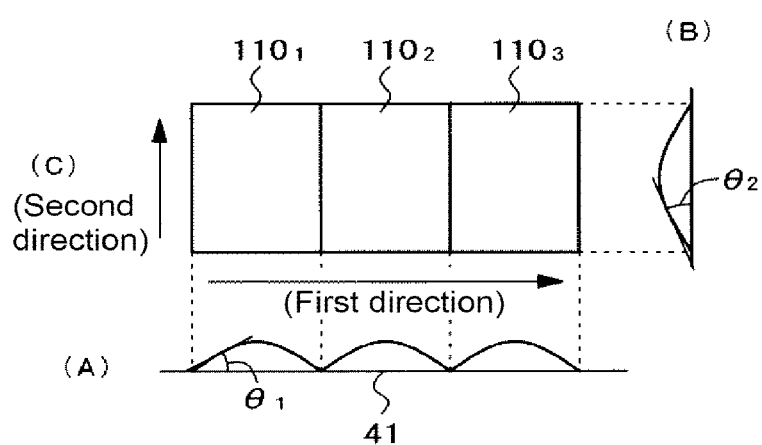
FIG. 4 is a three-view drawing illustrating the first direction and the second direction.

FIG. 4 is a three-view drawing illustrating the "first direction" and the "second direction" relating to the small lenses $110_1$ to $110_9$ used in the present and the after-described embodiments. FIG. 4(A) is a front view, FIG. 4(B) is a side view and FIG. 4(C) is a plan view. FIG. 4 illustrates three small lenses $110_1$ to $110_3$.

The "first direction" is one direction forming the largest angle (slant angle θ1) in a cross-sectional view with the reference surface 41 (see FIG. 4(A)). As an example, the reference surface 41 is a plane orthogonal to the normal of the transparent screen 100. The "second direction" is a direction forming the largest angle (slant angle θ2) in a cross-sectional view in a direction orthogonal to a straight line having a straight line indicating the selected "first direction" projected on the reference surface (see FIG. 4(C)).

The curvature in the first direction and the curvature in the second direction of each of the small lenses $110_1$ to $110_9$ are different from each other. The curvature in the first direction or the second direction may be 0, that is, the surface may be flat.

Figure 5:
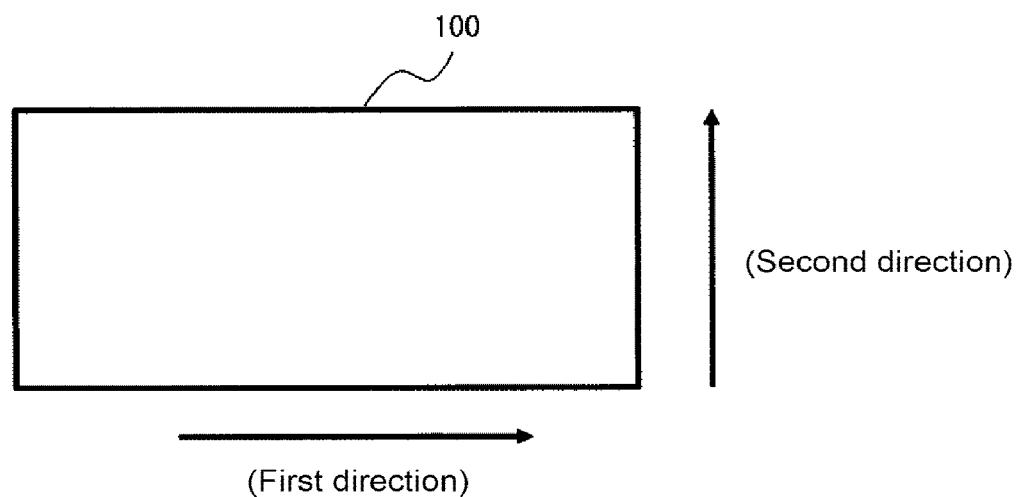
FIG. 5 is a view illustrating the first direction and the second direction.

Simply, as shown in FIG. 5, the height direction of the transparent screen 100 may be taken as the second direction, and the lengthwise direction (direction orthogonal to the second direction) of the transparent screen 100 may be taken as the first direction. Also in a case where the shape of the transparent screen 100 is concave to the depth side (back side) as observed from the front, the height direction of the transparent screen 100 is taken as the second direction. The first direction is, for example, a direction in parallel with a plane orthogonal to the normal at the center portion of the transparent screen 100, and orthogonal to the second direction.

Figure 6:
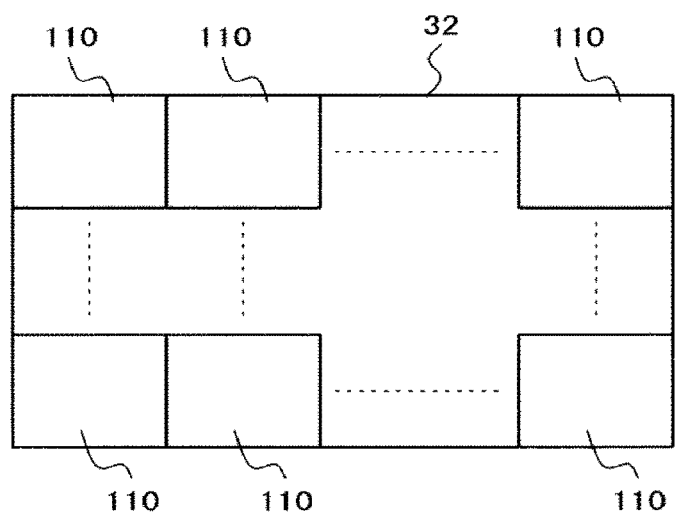
FIG. 6 is a view illustrating an example of the structure of the reflective transparent screen according to a first embodiment.

As shown in FIG. 6, according to the present embodiment, the shape of the surface of the first transparent layer 32 of the transparent screen 100 is a shape realized by the unit lenses 110 identical in shape arranged on the whole surface. And, the angle in the first direction (slant angle θ1) and the angle in the second direction (slant angle θ2) of the unit lenses 110 are set so that incident light is reflected toward the observer 300 present at a specific position, on the whole region of the transparent screen 100. That is, the shape of the surface of the first transparent layer 32 (corresponding to the shape of the reflective layer 40) is realized by the shape of the unit lenses 110 having the angle in the first direction and the angle in the second direction set as above. The slant angle θ1 is represented as a positive value when the angle formed by the unit lenses 110 is counterclockwise and as a negative value when clockwise, as observed from the second direction side relative to the reference surface of the first direction. The slant angle θ2 is defined as a positive value when the angle formed by the unit lenses 110 is counterclockwise and as a negative value when clockwise, as observed from the first direction side relative to the reference surface of the second direction.

In practice, the irregular surface of the reflective layer 40 (corresponding to the irregular surface of the first transparent layer 32) on the whole region of the transparent screen 100 is formed in one step.

Further, the specific position is, assuming a case where the transparent screen 100 is assembled into a windshield of a vehicle, typically the driver's seat, and the observer 300 present at the specific position is a driver. The specific position may be the passenger seat or the backseat. In such a case, the observer 300 present at the specific position is a passenger.

The respective unit lenses 110 shown in FIG. 6 are identical in shape. Each unit lens is constituted by a surface having a slant angle reflecting light entering the projection area toward the observer direction. Assuming that the position of the observer 300 (a driver for example) is, for example, the predetermined position based on the center portion of the transparent screen 100, the preferred reflection angle of light entering the center portion of the transparent screen 100 is uniquely determined. That is, the slant angles of the reflecting surface at the light incident part are uniquely determined. Since the slant angles of the reflecting surface at the respective light incident portions in the projection area are uniquely determined, the shape of the unit lenses reflecting light entering the projection area to the observer direction is automatically determined. Noting an assembly of the unit lenses disposed at the center portion of the transparent screen 100 is merely one example, and an assembly of unit lenses disposed at other portion of the transparent screen 100 may be employed as a reference.

According to the first embodiment, the shape of the surface of the first transparent layer 32 of the transparent screen 100 is the shape formed by the unit lenses 110 having a determined shape as above arranged on the whole region of the transparent screen 100. In other words, the transparent screen 100 has a structure such that unit lenses 110 identical in shape, condensing reflected light on the observer 300 on average, two-dimensionally arranged.

In the following embodiment, in order to increase the amount of reflected light toward the observer 300, in the transparent screen 100, the irregular surface of the first transparent layer 32 on which the reflective layer 40 is formed, is formed to include a region in which the slant angle in the first direction is within a range of from −44° to +44°, and the slant angle in the second direction is within a range of from −44° to +44°. Such ranges of the slant angles are applicable also in the present embodiment. If the slant angle in the first direction or in the second direction is out of the above range, the amount of reflected light toward the observer 300 decreases, and images cannot be recognized particularly in blight outside light environment, or the viewing angle is so narrow that images become invisible only by a little change of the observation position. More preferably, both the slant angles in the first direction and in the second direction are within a range of from −40° to +40°, and within such a range, high brightness can be achieved while maintaining a sufficient viewing angle as a screen.

As described above, the shape of the irregular surface of the first transparent layer 32 is realized by the shape of a plurality of the unit lenses 110. The slant angles of the unit lenses 110 are set preferably so that the intensity of the reflected light toward a position at which the observer 300 is to be present, is at least 50% of the maximum intensity of the reflected light at each position, more preferably at least 75%, further preferably at least 90%. Further, the surface of the unit lenses may have micro-irregularities imparted. The details of the micro-irregularities will be descried hereinafter.

By the structure according to the present embodiment, the amount of reflected light to the direction where the observer 300 is present can be increased. That is, high brightness is realized.

FIG. 7 is a cross sectional view illustrating an example of the structure of an image projecting structure 120 as a substrate of the transparent screen 100 of the present invention. In the structure shown in FIG. 7, the image projecting structure 120 is formed on a transparent substrate 60.

The transparent substrate 60 is made of glass or a transparent resin for example. In a case where glass is used as the transparent substrate 60, soda lime glass or alkali free glass is preferably used. Glass may be chemically tempered or subjected to hard coating, so as to improve durability. In a case where a transparent resin is used as the transparent substrate 60, a polycarbonate, PET, PEN, a cycloolefin polymer or the like is preferably used. The transparent substrate 60 is preferably one having no birefringence. It is preferred to select as the transparent substrate 60 one having a thickness with which durability as the substrate is kept.

The first transparent layer 32 is preferably a transparent resin layer. As the transparent resin, an acrylic resin, an epoxy resin, a polycarbonate resin, a silicon resin or an unsaturated polyester resin may, for example, be mentioned. The resin is preferably any of a photocurable resin, a thermosetting resin and a thermoplastic resin. The first transparent layer 32 has a transmittance of preferably at least 50%, more preferably at least 75%, further preferably at least 90%.

Further, the first transparent layer 32 is preferably formed of a resin having a refractive index of at least 1.4, whereby the image light is refracted when entering the first transparent layer 32, and the slant angle when reflected toward the observer can be reduced.

The first transparent layer 32 may be formed in layers. It may contain a filler. The difference in the refractive index between adjacent layers when the first transparent layer is formed in layers, or the difference in the refractive index between a filler and a resin layer as a binder is preferably within 0.05 in terms of minimizing the occurrence of turbidity, more preferably within 0.02 in terms of further increasing the transparency, further preferably within 0.01 in terms of minimizing the reduction in rearward visibility similar to blur as in a halo.

The second transparent layer 52 is preferably a transparent resin layer. The difference between the refractive index of the first transparent layer 32 and the refractive index of the second transparent layer is preferably smaller, for example, preferably at most 0.05. The second transparent layer 52 may be formed of the same kind of material as or a different kind of material from the first transparent layer 32, but is preferably formed of the same kind of material. When the second transparent layer 52 and the first transparent layer 32 are formed of the same transparent resin, it is easy to set the refractive indexes of both layers at the same value. As in the first transparent layer 32, the second transparent layer 52 has a transmittance of preferably at least 50%, more preferably at least 75%, further preferably at least 90%.

The second transparent layer 52 may be formed in layers. It may contain a filler. The difference in the refractive index between adjacent layers when the second transparent layer is formed in layers, or the difference in the refractive index between a filler and a resin layer as a binder is preferably within 0.05 in terms of minimizing the occurrence of turbidity, more preferably within 0.02 in terms of further increasing the transparency, further preferably within 0.01 in terms of minimizing the reduction in rearward visibility similar to blur as in a halo.

The reflective layer 40 is formed in a single layer or in layers of a metal film or a dielectric film. The reflective layer 40 may be formed of a combination thereof. As an example, the reflective layer 40 is formed of one metal element selected from Au, Ag, Cu, Al, Ni, Ti, Pd, Co, Si, Ta, W, Mo and Ge, an alloy containing two or more of such metal elements, or a material containing the oxide NbO or $SiO_2$ as the main component. Part of light which has entered the reflective layer 40 is transmitted, and other part is reflected.

The forming die may be processed not only by tools but also by laser or photolithography. In the case of processing by laser or photolithography, edges and valleys of the processed shape tend to be round, thereby to lower the haze. Further, reproducibility of the shape of edges and valleys tends to be low as compared with processing by tools, whereby periodicity of the shape tends to be minimized, and diffraction can be suppressed.

Now, an example for producing the image projecting structure 120 according to the first embodiment will be described.

As the support member (transparent substrate 60), a PET film (thickness: 0.075 mm) was prepared. Further, as the forming die, a mold having a desired shape (shape as shown in FIG. 3 or 4) on its surface was prepared. The mold has a shape corresponding to the shape of unit lenses as described hereinafter (hereinafter sometimes referred to as unit shape).

Then, the PET film was coated with a first resin by die coating to form the first transparent layer 32. As the first resin, an acrylic resin which is a bifunctional UV-curable resin (acrylic equivalent: 152) was used.

On the first resin, the forming die was disposed so that the surface having irregularities formed thereon was in contact with the first resin. In such a state, 1000 mJ UV light was applied from the opposite side from the forming die to cure the first resin thereby to form the first transparent layer 32.

The forming die was removed, whereby the first transparent layer 32 (thickness: about 35 μm) having an irregular surface was obtained on the PET film. On the irregular surface, irregularities formed by lenses described hereinafter were transcribed.

On the irregular surface of the first transparent layer 32, a Ag—Au alloy layer as the reflective layer 40 was formed by sputtering. The thickness of the reflective layer was 15 nm.

On the reflective layer 40, a resin for an adhesion layer was applied by die coating. As the resin for an adhesion layer, a linear polymer resin containing a polyester resin comprising a dicarboxylic acid and a diol as the main component, having Tg of 47° C., was used.

The diluent solvent was evaporated by heating at 110° C. for 5 minutes to form an adhesion layer. The mold shrinkage factor of the adhesion layer is less than 3%. The thickness of the adhesion layer was 1.5 μm.

On the adhesion layer, a second resin was applied by die coating. As the second resin, the same acrylic resin as the first resin was used.

In such a state, 1000 mJ UV light was applied from the second resin side to cure the second resin thereby to form a second transparent layer 52 (thickness: about 35 μm). The mold shrinkage factor of the second transparent layer 52 was about 10%.

By the above method, the image projecting structure 120 was produced.

Now, the method for producing the transparent screen 100 according to the first embodiment will be described with reference to FIG. 8.

First, as the first transparent substrate 10 and the second transparent substrate 11, soda lime glass having a thickness of 2 mm was prepared. Further, as the first adhesive layer and the second adhesive layer (not shown in FIG. 8), a PVB film having a thickness of 0.38 mm was prepared.

The first transparent substrate 10, the first adhesive layer, the image projecting structure 120, the second adhesive layer and the second transparent substrate 11 were laminated in order to constitute a laminate. The laminate in a vacuum-packed state was heated at 120° C. for 1 hour to obtain a transparent screen 100.

Example 1-1

A forming die 1-1 formed by unit lenses having a slant angle θ1 in the first direction of from −11° to 11° and a slant angle θ2 in the second direction of from −19° to 26°, two-dimensionally arranged to cover the whole region of the image display portion, was prepared. Using the forming die 1-1, the transparent screen 100 in Example 1-1 was prepared.

Comparative Example 1

A forming die X formed by spherical unit lenses having a maximum slant angle and a minimum slant angle in the first direction and in the second direction of 45°, two-dimensionally arranged to cover the whole region of the image display portion, was prepared. Using the forming die X, the transparent screen in Comparative Example 1 was prepared.

With respect to the above obtained transparent screens in Example 1-1 and Comparative Example 1, the brightness of a reflected image at an outgoing angle of −5° from the normal direction of the projection surface, at an incident angle of incident light fixed at 0°, that is, in the normal direction of the projection surface, was obtained by simulation. Based on the brightness in Comparative Example 1 being 1, the result obtained by multiplying the brightness in Example 1-1 is shown in Table 1.

TABLE 1

|  | θ1 | θ2 | Image brightness |
|---|---|---|---|
| Ex. 1-1 | −11° to +11° | −19° to +26° | 8 |
| Comp. Ex. 1 | −45° to +45° | −45° to +45° | 1 |

As shown in Table 1, the brightness can be improved by setting the slant angle in the first direction to be within a range of from −44° to +44° and the slant angle in the second direction to be within a range of from −44° to +44°.

In FIG. 8, the transparent substrate 60 and the first transparent substrate 10 are drawn separately for convenience, however, the transparent substrate 60 may be considered as one embodiment of the first transparent substrate 10. Accordingly, as the transparent substrate 60, one made of the same material as the first transparent substrate 10 may be used. Further, the transparent substrate 60 and the first transparent substrate 10 may be integrated into one transparent layer.

Second Embodiment

In the first embodiment, the transparent screen 100 has a structure such that the unit lenses 110 are arranged on the whole surface (FIG. 6). However, if units lenses 110 having similar shape (planar shape) are periodically arranged, diffraction may occur to cause nonuniformity in brightness.

According to a second embodiment, to prevent diffraction, the transparent screen 100 has a structure such that unit lenses 110 differing in shape are arranged.

Figure 9:
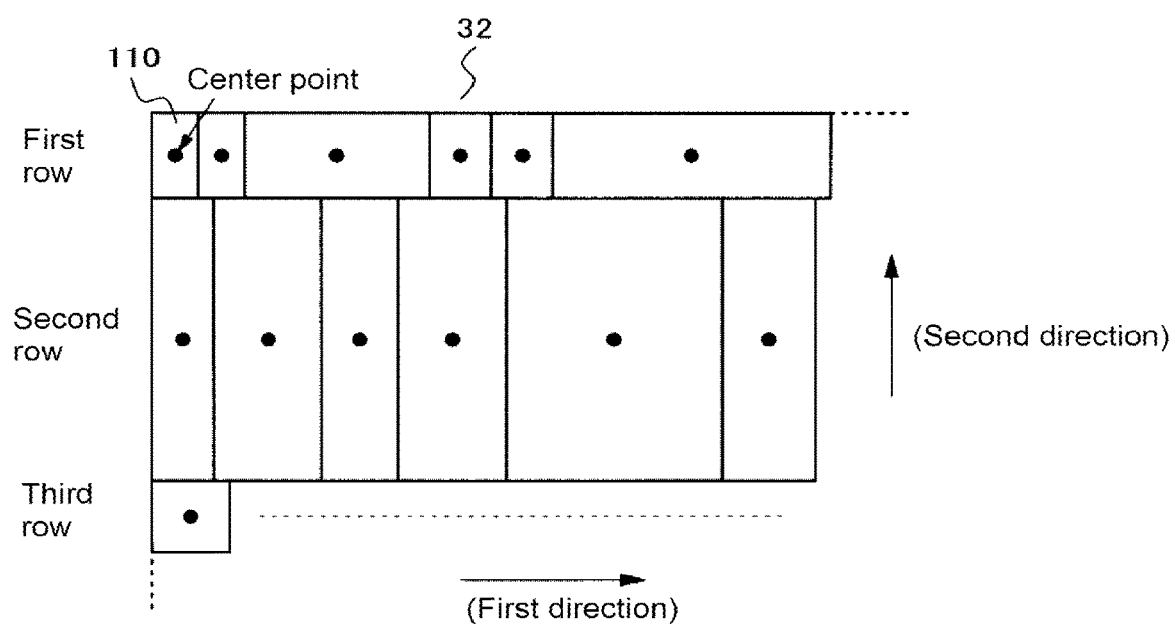
FIG. 9 is a view illustrating an example of the structure of the reflective transparent screen according to a second embodiment.

FIG. 9 is a view illustrating an example of the structure of the reflective transparent screen according to a second embodiment. In the second embodiment, the shape of the first transparent layer 32 of the transparent screen 100 may be such that unit lenses 110 differing in shape are two-dimensionally arranged, or as shown in FIG. 9, unit lenses 110 differing in shape may be randomly arranged. In FIG. 9, each rectangle corresponds to a unit lens 110.

The example shown in FIG. 9 is an example of random arrangement, and in the example shown in FIG. 9, center points are randomly disposed respectively in the first direction and in the second direction.

And, the shapes of the unit lenses 110 are determined so that the respectively disposed center points correspond to the center points of the respective unit lenses 110.

The first direction slant angle and the second direction slant angle of each unit lens 110 of the transparent screen 100 are determined based on the same concept as in the first embodiment. That is, in the present embodiment also, the transparent screen 100 has a structure such that the units lenses 110 condensing reflected light on the observer 300 on average are arranged.

On that occasion, the shapes of the unit lenses 110 are determined by simulation so that light is reflected to the position of the observer 300. In a case where there are two or more observers 300, unit lenses differing in shape may be used, each unit lens constituted to reflect light to each observer.

In the second embodiment, it is possible to prevent diffraction by eliminating periodicity of the arrangement of the unit lenses 110.

In the second embodiment, as described above, a plurality of unit lenses 110 are randomly arranged in the transparent screen 100, however, they may not be randomly arranged without restriction but may be randomly arranged under certain restrictions. As an example, the average intervals between the center points are within a range of from 10 µm to 500 µm both in the first direction and in the second direction.

Figure 10:
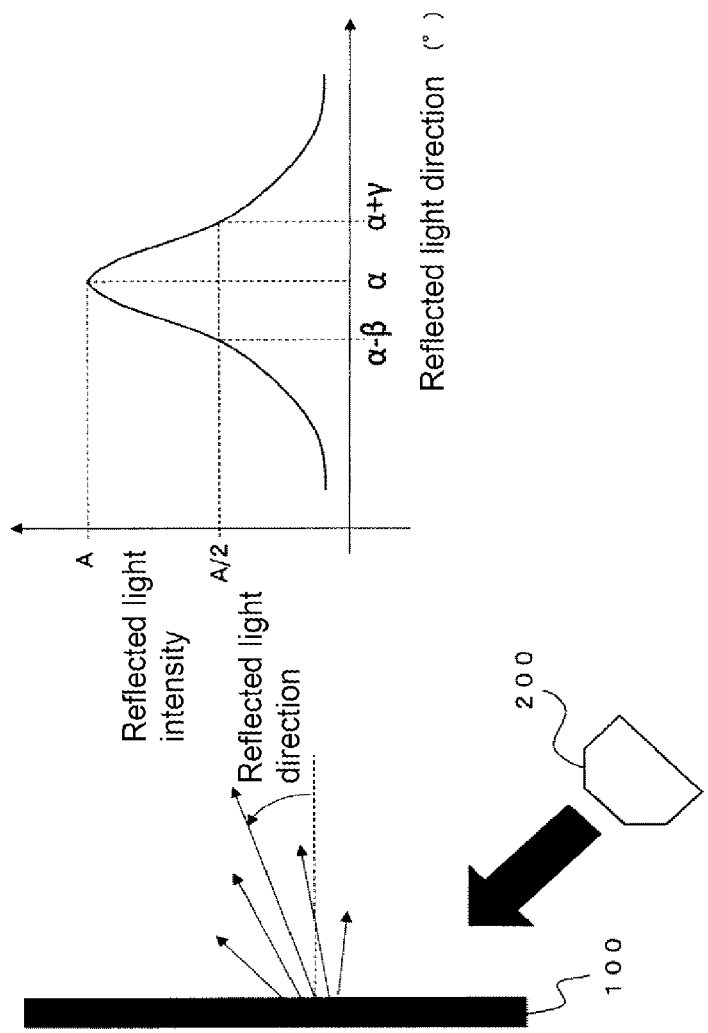
FIG. 10 is a view illustrating the reflected light intensity distribution when light is made to enter the screen.

Further, micro-irregularities may be imparted to the surface of the unit lenses. By imparting micro-irregularities, it is possible to scatter light within a predetermined angle. This angle is taken as the scattering angle and is defined as the full width at half maximum of the peak of the reflected light. The scattering angle will be described with reference to FIG. 10. In FIG. 10, the reflected light intensity distribution when light is made to enter the transparent screen 100 from the projector 200 is shown. In this case, the peak of the reflected light intensity is at the angle α°, the half maximums of the peak of the reflected light intensity are at the angle (α-β) ° and the angle (α+γ) °, and the full width at half maximum is (γ+β°), and thus the scattering angle is (γ+β) °. The scattering angle is preferably within ±50°, in view of utilization efficiency of reflected light from the transparent screen 100.

As a method to impart micro-irregularities, a method of applying physical cutting to the surface of the material for forming the forming die (e.g. dry etching, wet etching, sand blasting or laser abrasion), a method of utilizing surface forming by extrusion, a method of utilizing the surface structure formed when a mixed member such as fine particles is molded, or coating with a self-organizing material, may, for example, be mentioned.

When the micro-irregularities are imparted to the surface of the unit lenses, the reflective layer 40 is formed to follow the micro-irregularities. On that occasion, since the reflective layer 40 is thinner than the micro-irregularities, the surface of the reflective layer 40 has a shape which reflects the micro-irregularities. Here, the surface roughness of the reflective layer 40 (that is the surface roughness of the unit lenses 110) is preferably such that the arithmetic mean surface roughness Ra (JIS B0601-2001) is within a range of from 0.005 um to 5 µm, with a view to scattering light within a predetermined angle. The surface roughness Ra of the reflecting surface of the reflective layer 40 may properly be selected e.g. in accordance with the desired optical performance, etc.

Example 2-1

Figure 11:
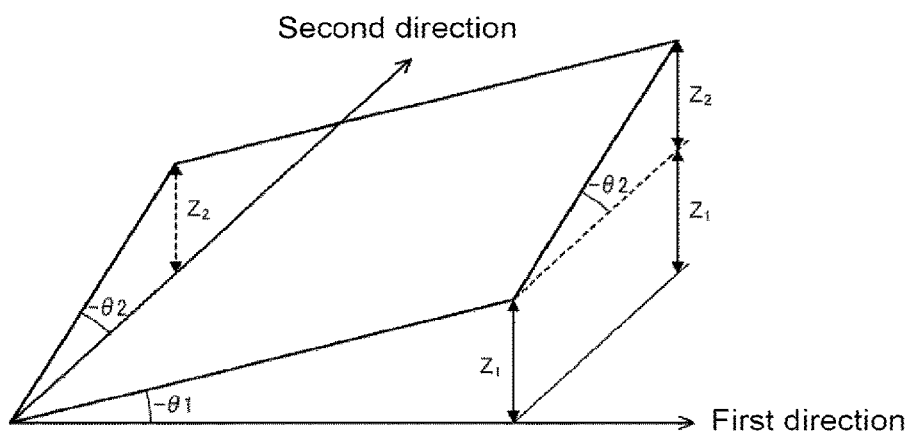
FIG. 11 is an oblique view illustrating a unit lens constituting a part of the transparent screen in Example 2-1.

Unit lenses having a shape as shown in FIG. 11, having a slant angle θ1 in the first direction of +15° and a slant angle θ2 in the second direction of +15° were periodically arranged under the following conditions to obtain an assembly of the unit lenses.

Average interval between center points in the first direction: 50 µm, 30% relative to the average interval were randomly arranged.

Average interval between center points in the second direction: 50 µm, 30% relative to the average interval were randomly arranged.

To the assembly of the unit lenses, micro-irregularities (scattering angle: ±20°) were imparted to prepare a forming die 2-1. Ra was 0.15 µm measured by applying a lowpass filter with a cutoff frequency of 10 µm to the irregular surface having the micro-irregularities.

The transparent screen 100 was prepared in the same manner as in Example 1-1 except that the forming die 2-1 was used.

Comparative Example 2

The same unit lenses as in Comparative Example 1-1 were periodically arranged so that the average intervals between center points would be as follows, to obtain an assembly of the unit lenses.

Average interval between center points in the first direction: 56 µm

Average interval between center points in the second direction: 80 µm

A forming die Y was prepared without imparting micro-irregularities. Ra measured in the same manner as in Example 2-1 was 0.22 µm. Using the forming die Y, the transparent screen in Comparative Example 2 was prepared.

With respect to the above obtained transparent screens in Example 2-1 and Comparative Example 2, the brightness of an image was obtained by simulation in the same manner as in Example 1-1. Based on the brightness in Comparative Example 2 being 1, the results obtained by multiplying the brightnesses in Example 2-1 and Comparative Example 2 are shown in Table 2.

TABLE 5

|  | θ1 | θ2 | Lens arrangement | Ra [μm] | Image brightness | First order diffraction | First order diffraction efficiency |
|---|---|---|---|---|---|---|---|
| Ex. 2-1 | +15° | +15° | Random (30%) | 0.15 | 81 | Nil | 0.0002 |
| Comp. Ex. 2 | −45° to +45° | −45° to +45° | Periodic | 0.22 | 1 | Observed | 0.004 |

Figure 12:
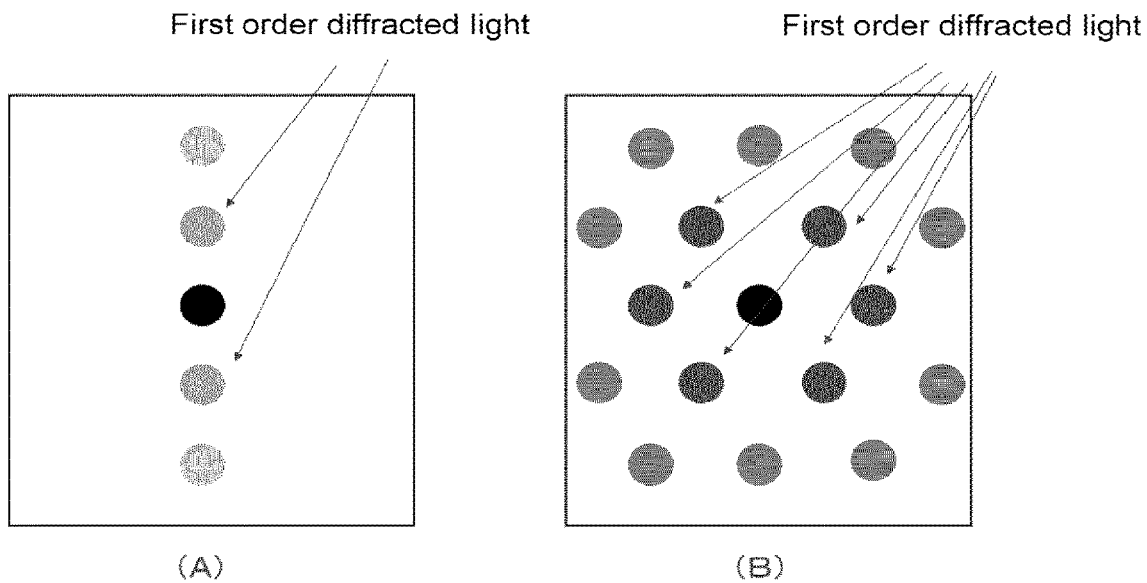
FIG. 12 is views illustrating occurrence of diffraction in the transparent screens in Example 2-1 and Comparative Example 2.

The results of occurrence of diffraction in the transparent screen 100 in Example 2-1 are shown in FIG. 12(A), and the results of occurrence of diffraction in the transparent screen in Comparative Example 2 are shown in FIG. 12(B). As evident from FIG. 12, in the transparent screen in Comparative Example 2, first order diffraction from the center points of image light was observed, whereupon in the transparent screen 100 in Example 2-1, substantially no first order diffracted light was observed. From the ratio of the first order diffracted light intensity measured by a power meter to the incident light intensity, the first order diffraction efficiency (=first order diffracted light intensity/incident light intensity) was calculated and is shown in Table 2. The first order light diffraction efficiency in Comparative Example 2 is 0.004, whereupon the first order light diffraction efficiency in Example 2-1 is 0.0002, proving that the diffraction can be suppressed.

Third Embodiment

According to the first embodiment, the shape of the first transparent layer 32 in the transparent screen 100 was such that the unit lenses 110 identical in shape are arranged on the whole region of the transparent screen 100.

According to the present embodiment, the shapes of the unit lenses 110 differ among the positions on the transparent screen 100. That is, the slant angles of the unit lenses 110 in the first direction and the slant angles in the second direction differ among the positions on the transparent screen 100. Accordingly, with respect to a projector with a large projection angle such as a very short focus projector, the image light can be reflected to the direction of the observer, thus increasing the image brightness.

Further, as described in the following Examples, the slant angles of the respective unit lenses 110 continuously change in the first direction and in the second direction respectively. Further, the unit lenses may have micro-irregularities on their surface.

Now, Examples in this embodiment will be described. The respective Examples are Examples in which mainly the slant angles θ1 in the first direction and the slant angles θ2 in the second direction of the unit lenses 110 are changed in accordance with the projector 200 disposition positions. In the following Examples, the curvatures of the unit lenses 110 in the first direction and in the second direction are respectively 0.

The transparent screen 100 assembled into a windshield of a vehicle is taken as an example. The projector 200 as an example of a projecting apparatus is disposed at a predetermined portion on the front side of the transparent screen 100, as an example. Further, it was assumed that the projector 200 is disposed at any of a plurality of positions in the interior of a vehicle, fixing the position of the observer 300 (located in the driver's seat in this example) (that is the position assumed as the position of eyes of an average driver in the driver's seat). And, the slant angles of the reflecting surface at each position on the projection area depending upon the projector 200 disposition positions were obtained by simulation.

The "slant angle of the unit lens 110" is the slant angle of the reflecting surface at each position on the transparent screen 100, that is on a windshield since in this case, the transparent screen 100 is assembled into the windshield, and represents the slant angle on each position. Specifically, the slant angles θ1 in the first direction at a plurality of predetermined positions in the second direction and the slant angles θ2 in the second direction at a plurality of predetermined positions in the first direction were obtained by simulation. The first direction and the second direction are as shown in FIG. 5.

Figure 13:
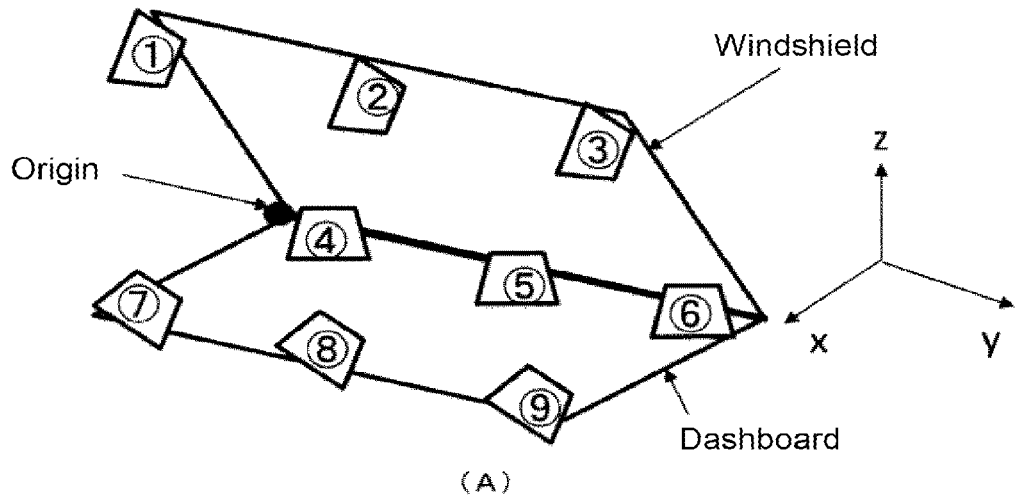
FIG. 13 is views illustrating projector disposition positions.
Figure 14:
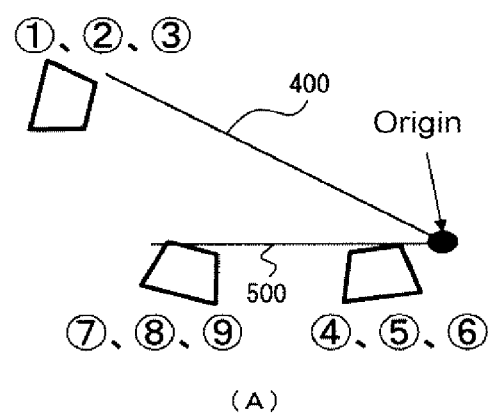
FIG. 14 is views illustrating projector disposition positions.
Figure 14:
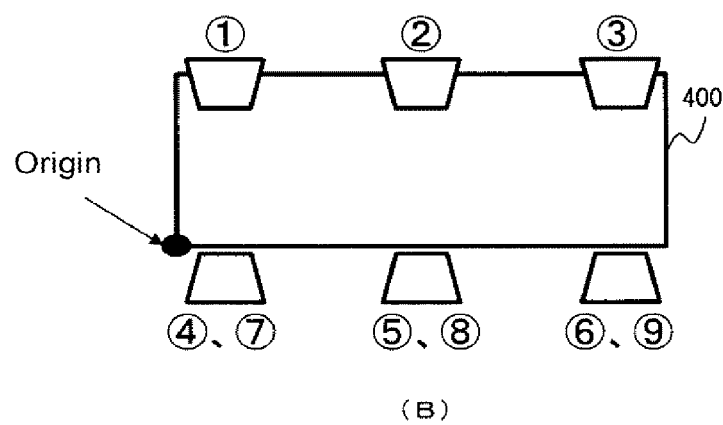

The projector 200 disposition positions in the respective Examples are shown in FIGS. 13 and 14. FIG. 13(A) is an oblique view schematically illustrating the projector 200 disposition positions. FIG. 13(B) is a drawing illustrating the projector 200 disposition positions and the positions of the observer. FIG. 14(A) is a cross sectional view schematically illustrating the projector 200 disposition positions. FIG. 14(B) is a front view schematically illustrating the projector 200 disposition positions.

In FIGS. 13 and 14, the trapezoids represent the projector 200 disposition positions. That is, in the following Examples, the projector 200 is located at any of the positions of the trapezoids corresponding to the positions (1) to (9) in FIGS. 13 and 14.

The unit of numerical values in FIG. 13(B) is "cm". Further, in the following Examples, the surface shape of the transparent screen 100 was flat.

As shown in FIGS. 13(A) and 13(B), three among nine assumed projector 200 disposition positions are upper parts of the windshield (positions (1) to (3)). Other three are in the vicinity of the boundary between the windshield 400 and the upper surface of the dashboard 500 (positions (4) to (6)), and the other three are at the edge on the driver's side on the dashboard 500 (positions (7) to (9)) (see FIGS. 14(A) and 14(B) also).

y coordinates at the positions (1), (4) and (7) are the same (=0). y coordinates at the positions (2), (5) and (8) are the same (=70). y coordinates at the positions (3), (6) and (9) are the same (=140) (see FIG. 14(B)).

Example 3-1

Figure 15:
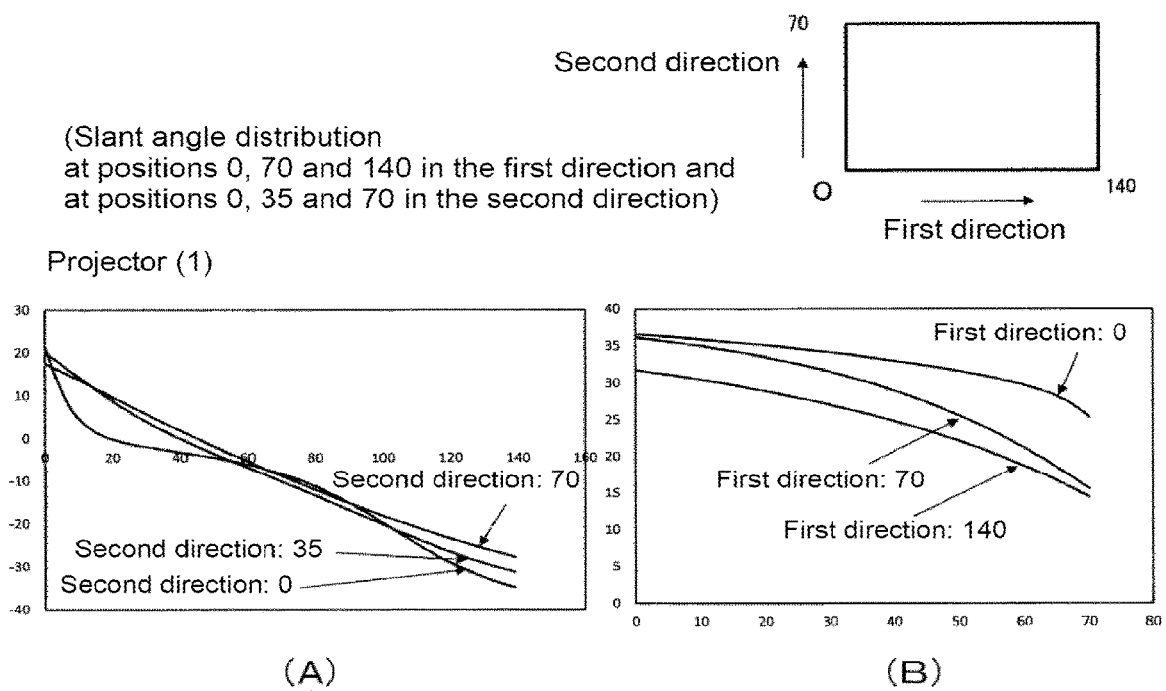
FIG. 15 is views illustrating the slant angles of the reflecting surface at the respective positions in the transparent screen in Example 3-1.

FIG. 15 is views illustrating the slant angles of the reflecting surface at the respective positions in the transparent screen 100 when the projector 200 is located at the position (1). In this Example, it is assumed that the transparent screen 100 is present on the whole region of the windshield 400 shown in FIG. 15. The same applies to the other Examples.

FIG. 15(A) illustrates the slant angles θ1 in the first direction at the positions "0", "35" and "70" in the second direction in the transparent screen 100.

FIG. 15(B) illustrates the slant angles θ2 in the second direction at the positions "0", "70" and "140" in the first direction in the transparent screen 100.

Hereinafter the slant angle in the first direction shown in FIG. 15(A) will be referred to as "first direction slant angle θ1", and the slant angle in the second direction shown in FIG. 15(B) will be referred to as "second direction slant angle θ2"

In Example 3-1, the first direction slant angles θ1 at all the positions "0", "35" and "70" in the second direction are within a range of from −35° to +21°. The second direction slant angles θ2 at all the positions "0", "70" and "140" in the first direction are within a range of from +15° to +37°.

Example 3-2

Figure 16:
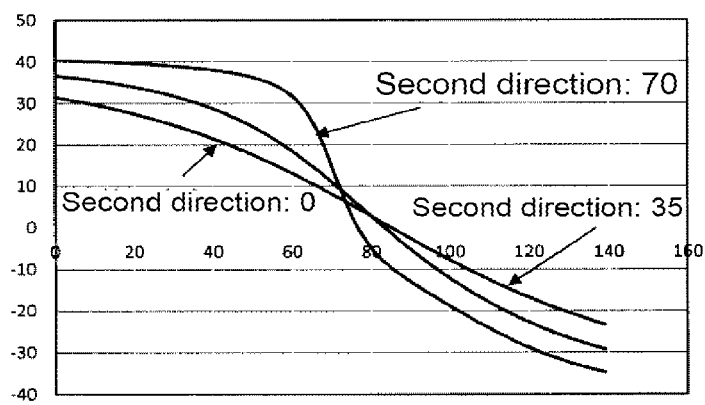
FIG. 16 is views illustrating the slant angles of the reflecting surface at the respective positions in the transparent screen in Example 3-2.
Figure 16:
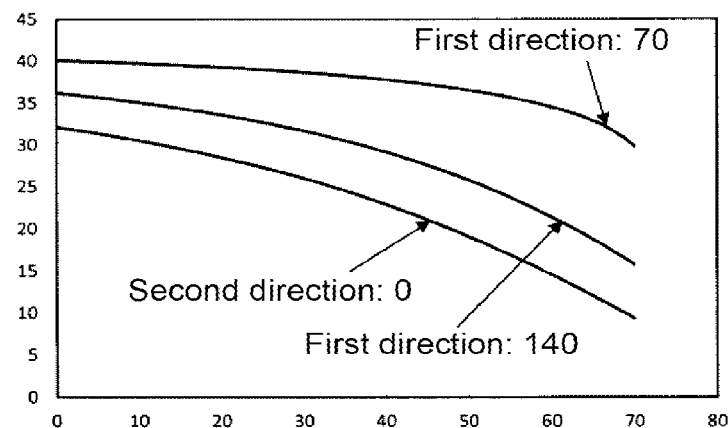

FIG. 16 is views illustrating the slant angles of the reflecting surface at the respective positions in the transparent screen 100 when the projector 200 is located at the position (2).

FIG. 16(A) illustrates the first direction slant angles θ1 at the positions "0", "35" and "70" in the second direction in the transparent screen 100. FIG. 16(B) illustrates the second direction slant angles θ2 at the positions "0", "70" and "140" in the first direction in the transparent screen 100.

In Example 3-2, the first direction slant angles θ1 at all the positions "0", "35" and "70" in the second direction are within a range of from −35° to +40°. The second direction slant angles θ2 at all the positions "0", "70" and "140" in the first direction are within a range of from +9° to +40°.

Example 3-3

Figure 17:
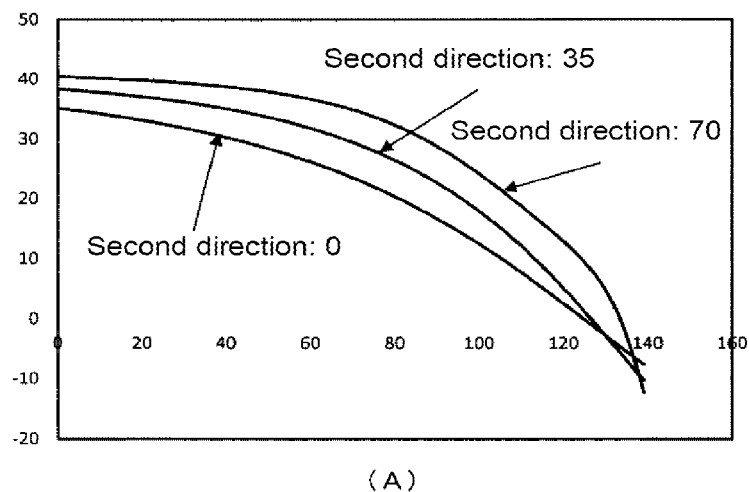
FIG. 17 is views illustrating the slant angles of the reflecting surface at the respective positions in the transparent screen in Example 3-3.
Figure 17:
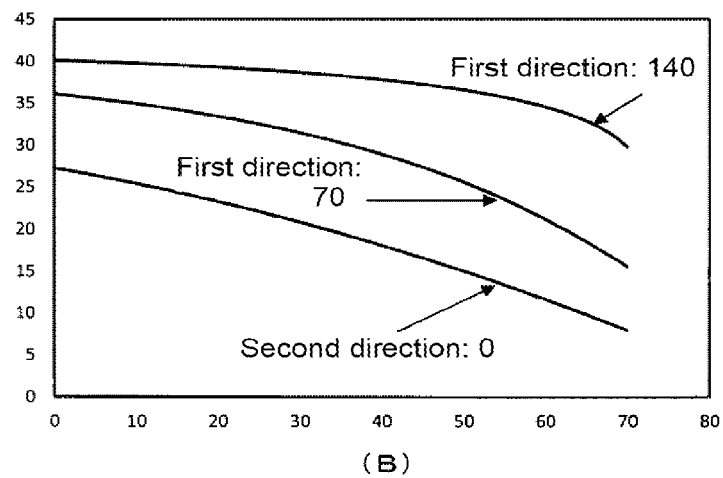

FIG. 17 is views illustrating the slant angles of the reflecting surface at the respective positions in the transparent screen 100 when the projector 200 is located at the position (3).

FIG. 17(A) illustrates the first direction slant angles θ1 at the positions "0", "35" and "70" in the second direction in the transparent screen 100. FIG. 17(B) illustrates the second direction slant angles θ2 at the positions "0", "70" and "140" in the first direction in the transparent screen 100.

In Example 3-3, the first direction slant angles θ1 at all the positions "0", "35" and "70" in the second direction are within a range of from −12° to +40°. The second direction slant angles θ2 at all the positions "0", "70" and "140" in the first direction are within a range of from +8° to +40°.

Example 3-4

Figure 18:
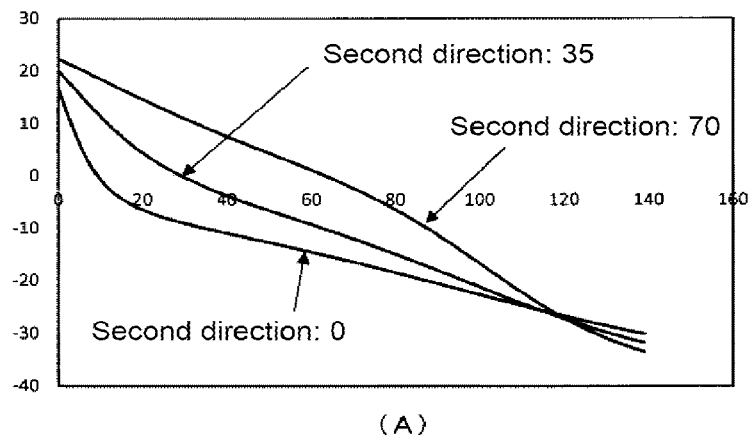
FIG. 18 is views illustrating the slant angles of the reflecting surface at the respective positions in the transparent screen in Example 3-4.
Figure 18:
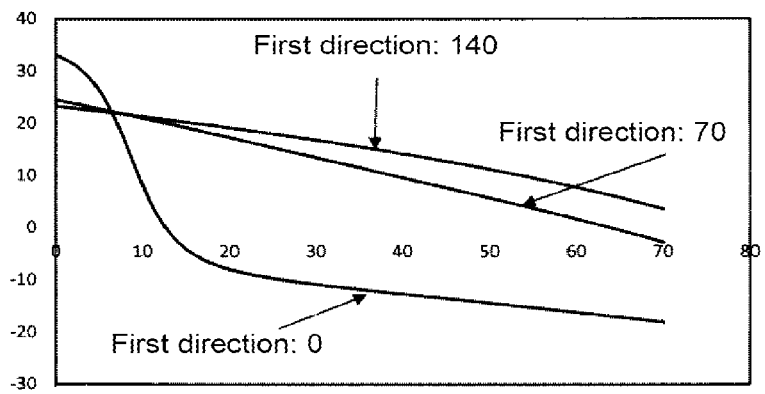

FIG. 18 is views illustrating the slant angles of the reflecting surface at the respective positions in the transparent screen 100 when the projector 200 is located at the position (4).

FIG. 18(A) illustrates the first direction slant angles θ1 at the positions "0", "35" and "70" in the second direction in the transparent screen 100. FIG. 18(B) illustrates the second direction slant angles θ2 at the positions "0", "70" and "140" in the first direction in the transparent screen 100.

In Example 3-4, the first direction slant angles θ1 at all the positions "0", "35" and "70" in the second direction are within a range of from −33° to +22°. The second direction slant angles θ2 at all the positions "0", "70" and "140" in the first direction are within a range of from −18° to +33°.

Example 3-5

Figure 19:
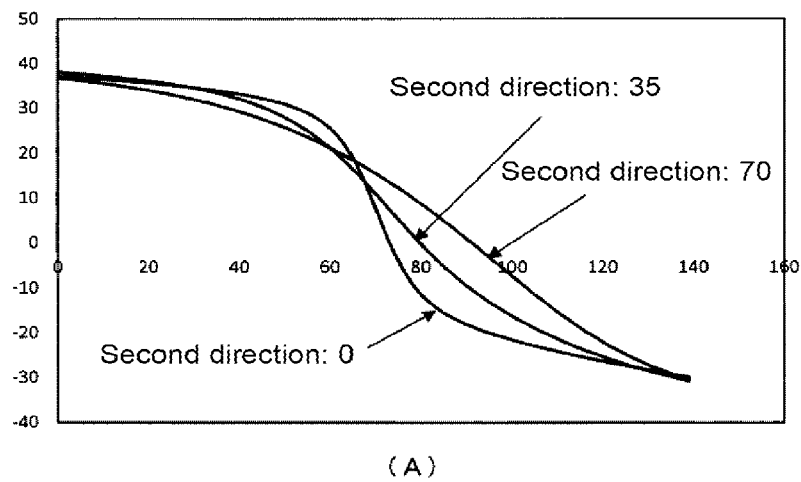
FIG. 19 is views illustrating the slant angles of the reflecting surface at the respective positions in the transparent screen in Example 3-5.
Figure 19:
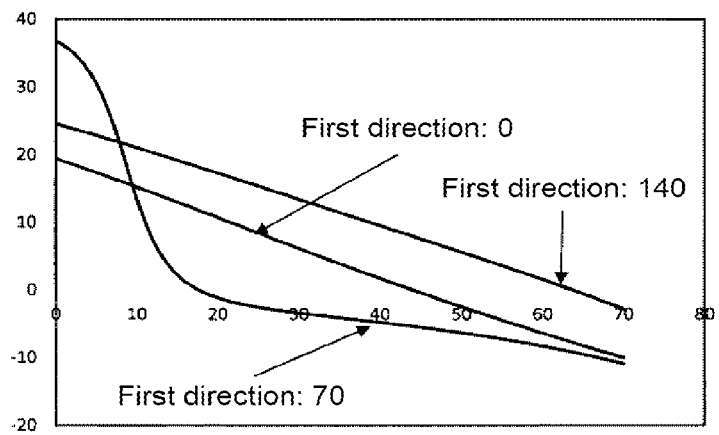

FIG. 19 is views illustrating the slant angles of the reflecting surface at the respective positions in the transparent screen 100 when the projector 200 is located at the position (5).

FIG. 19(A) illustrates the first direction slant angles θ1 at the positions "0", "35" and "70" in the second direction in the transparent screen 100. FIG. 19(B) illustrates the second direction slant angles θ2 at the positions "0", "70" and "140" in the first direction in the transparent screen 100.

In Example 3-5, the first direction slant angles θ1 at all the positions "0", "35" and "70" in the second direction are within a range of from −30° to +38°. The second direction slant angles θ2 at all the positions "0", "70" and "140" in the first direction are within a range of from −11° to +37°.

Example 3-6

Figure 20:
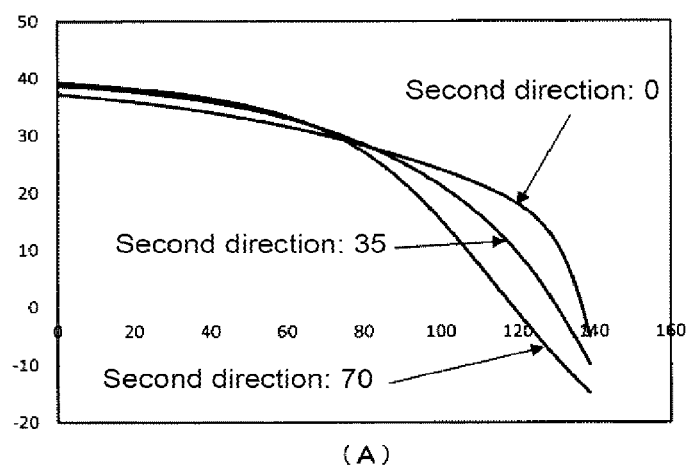
FIG. 20 is views illustrating the slant angles of the reflecting surface at the respective positions in the transparent screen in Example 3-6.
Figure 20:
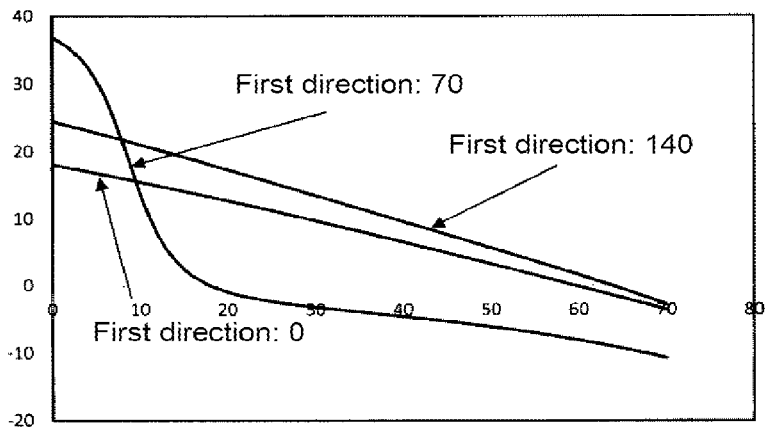

FIG. 20 is views illustrating the slant angles of the reflecting surface at the respective positions in the transparent screen 100 when the projector 200 is located at the position (6).

FIG. 20(A) illustrates the first direction slant angles θ1 at the positions "0", "35" and "70" in the second direction in the transparent screen 100. FIG. 20(B) illustrates the second direction slant angles θ2 at the positions "0", "70" and "140" in the first direction in the transparent screen 100.

In Example 3-6, the first direction slant angles θ1 at all the positions "0", "35" and "70" in the second direction are within a range of from −15° to +40°. The second direction slant angles θ2 at all the positions "0", "70" and "140" in the first direction are within a range of from −10° to +37°.

Example 3-7

Figure 21:
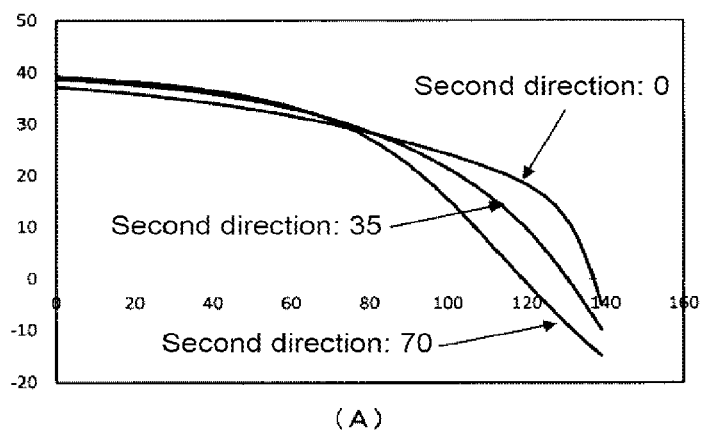
FIG. 21 is views illustrating the slant angles of the reflecting surface at the respective positions in the transparent screen in Example 3-7.
Figure 21:
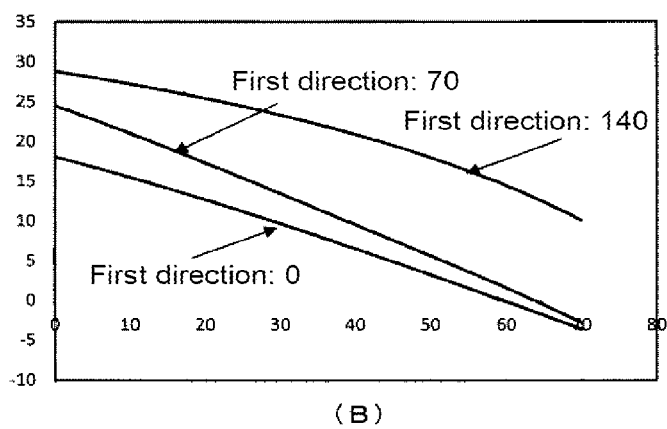

FIG. 21 is views illustrating the slant angles of the reflecting surface at the respective positions in the transparent screen 100 when the projector 200 is located at the position (7).

FIG. 21(A) illustrates the first direction slant angles θ1 at the positions "0", "35" and "70" in the second direction in the transparent screen 100. FIG. 21(B) illustrates the second direction slant angles θ2 at the positions "0", "70" and "140" in the first direction in the transparent screen 100.

In Example 3-7, the first direction slant angles θ1 at all the positions "0", "35" and "70" in the second direction are within a range of from −15° to +40°. The second direction slant angles θ2 at all the positions "0", "70" and "140" in the first direction are within a range of from −4° to +29°.

Example 3-8

Figure 22:
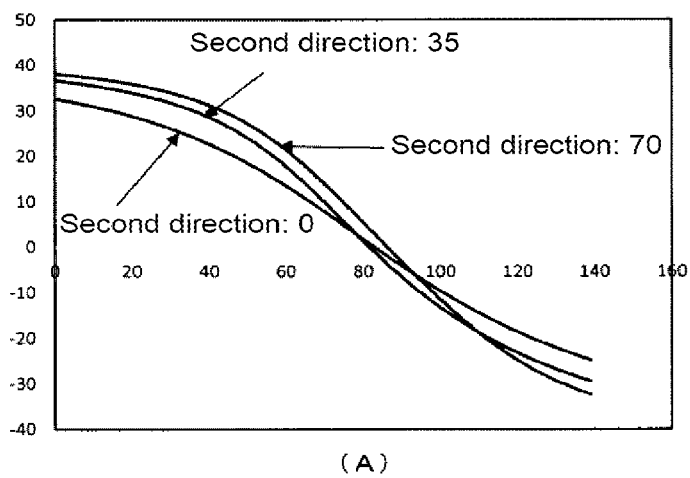
FIG. 22 is views illustrating the slant angles of the reflecting surface at the respective positions in the transparent screen in Example 3-8.
Figure 22:
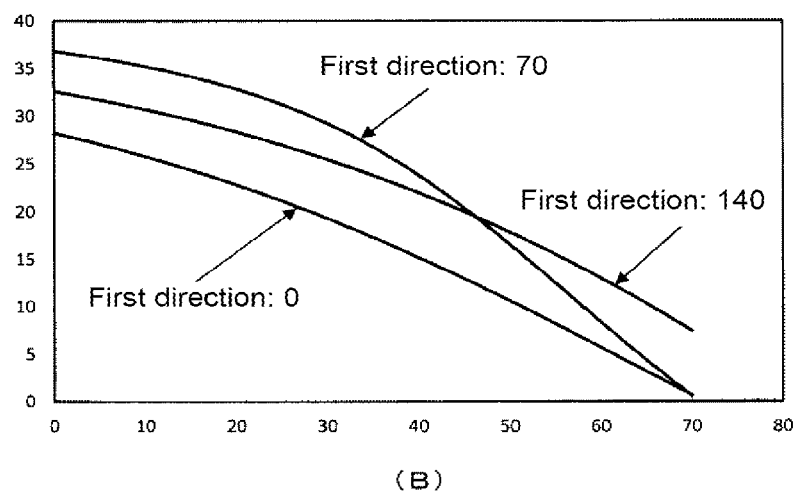

FIG. 22 is views illustrating the slant angles of the reflecting surface at the respective positions in the transparent screen 100 when the projector 200 is located at the position (8).

FIG. 22(A) illustrates the first direction slant angles θ1 at the positions "0", "35" and "70" in the second direction in the transparent screen 100. FIG. 22(B) illustrates the second direction slant angles θ2 at the positions "0", "70" and "140" in the first direction in the transparent screen 100.

In Example 3-7, the first direction slant angles θ1 at all the positions "0", "35" and "70" in the second direction are within a range of from −32° to +39°. The second direction slant angles θ2 at all the positions "0", "70" and "140" in the first direction are within a range of from +1° to +37°.

Example 3-9

Figure 23:
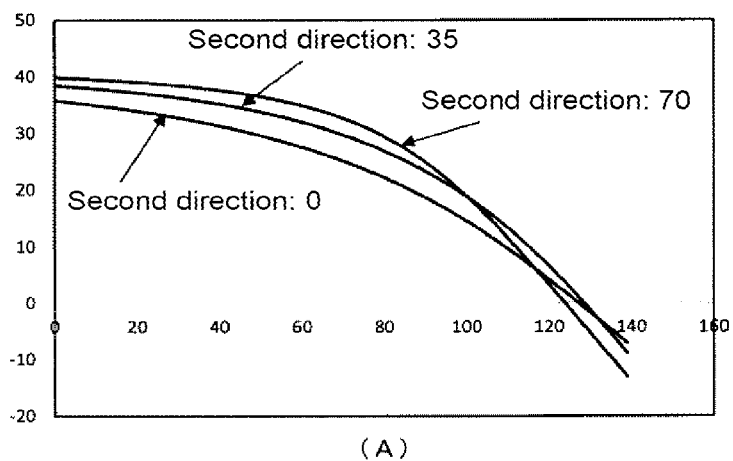
FIG. 23 is views illustrating the slant angles of the reflecting surface at the respective positions in the transparent screen in Example 3-9.
Figure 23:
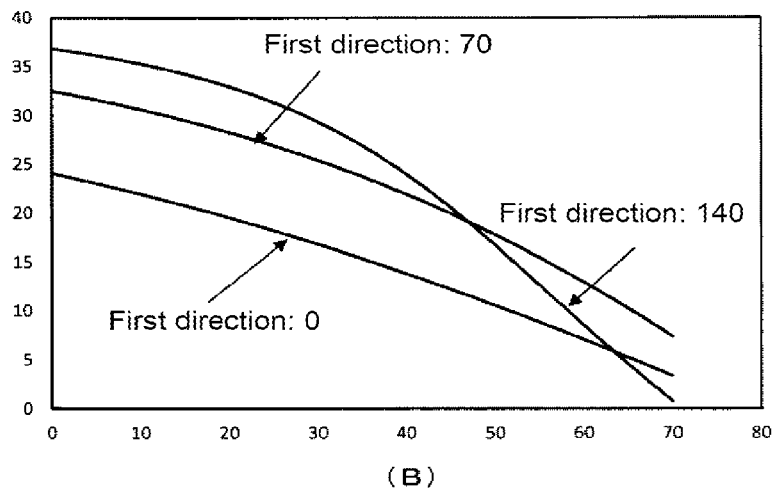

FIG. 23 is views illustrating the slant angles of the reflecting surface at the respective positions in the transparent screen 100 when the projector 200 is located at the position (9).

FIG. 23(A) illustrates the first direction slant angles θ1 at the positions "0", "35" and "70" in the second direction in the transparent screen 100. FIG. 23(B) illustrates the second direction slant angles θ2 at the positions "0", "70" and "140" in the first direction in the transparent screen 100.

In Example 3-9, the first direction slant angles θ1 at all the positions "0", "35" and "70" in the second direction are within a range of from −13° to +40°. The second direction slant angles θ2 at all the positions "0", "70" and "140" in the first direction are within a range of from +1° to +37°.

From Examples 3-1 to 3-9, the slant angles (the first direction slant angles θ1 and the second direction slant angles θ2) of the unit lenses 110 being within a range of from −44° to +44° are considered to be favorable slant angles.

As shown in FIGS. 15 to 23, the slant angles of the unit lenses 110 continuously change in the first direction and in the second direction respectively. However, the respective unit lenses 110 may be formed so that the slant angles in the first direction and in the second direction respectively change stepwise (the continuous curve is a stepwise curve as shown in FIGS. 15 to 23). That is, for example, the slant angles of adjacent two unit lenses may be discontinuous.

Centering on the unit lens 110 disposed at a portion corresponding to the front of the observer 300 in the transparent screen 100, the slant angles of the unit lenses 110 may be changed gradually or stepwise toward the periphery or the edge. Specifically, by changing the slant angles of the unit lenses 110 so that the first direction slant angles θ1 and the second direction slant angles θ2 gradually increase as the distance from the image center on the transparent screen 100 increases, the image can effectively be reflected to the observer 300, and high brightness tends to be realized.

[Comparison of Brightness]

The brightness of the transparent screen 100 in a case where the unit lenses in Examples 3-1 to 3-9 were used was compared with that in a case where the spherical unit lenses in Comparative Example 1 were used.

The luminous flux density of the transparent screen 100 when the unit lenses (scattering angle: considered to be ±2.5°) in each of Examples 3-1 to 3-9 are used, is calculated to be about 1000 times the luminous flux density when the spherical unit lenses (scattering angle: considered to be ±90°) in Comparative Example 1-1 are used. As a result, the maximum brightness of the transparent screen 100 constituted by using the unit lenses in each of Examples 3-1 to 3-9 is also calculated to be about 1000 times that in Comparative Example 1-1.

[Comparison of Viewing Angle]

The viewing angle of the transparent screen 100 in a case where micro-irregularities with a scattering angle of ±15° were imparted to the unit lenses in each of Examples 3-1 to 3-9, was compared with that in a case where the unit lenses (scattering angle: considered to be ±2.5°) in each of Examples 3-1 to 3-9 were used.

In a case where the unit lenses in Examples 3-1 to 3-9 have micro-irregularities with a scattering angle of ±15°, the viewing angle on the image surface of the transparent screen 100 can be made 6 times that in a case where no micro-irregularities were imparted.

In all of Examples 3-1 to 3-9, no first order light diffraction was observed.

As described above, according to the third embodiment, in the transparent screen 100, the irregular surface of the first transparent layer 32 on which the reflective layer 40 is formed, is formed to include a region in which the slant angle θ1 in the first direction is within a range of from −44° to +44° and the slant angle θ2 in the second direction is within a range of from −44° to +44°, whereby the image light projected from the projecting apparatus can be reflected toward the observer 300 at a narrow viewing angle. Further, as the viewing angle becomes narrow, the amount of reflected light to the observer 300 increases, whereby high brightness can be realized.

Particularly, the irregular surface of the first transparent layer 32 is preferably formed to include a region in which the slant angle θ1 in the first direction is from −35° to 40° and the slant angle θ2 in the second direction is from −18° to 40°. In a case where the transparent screen 100 is applied to a vehicle windshield, by setting the slant angles to be within the above ranges, image light projected from the projecting apparatus can be reflected to the driver at a narrow viewing angle, whereby high brightness can be realized.

Further, when the irregular surface of the first transparent layer 32 has micro-irregularities with a scattering angle within ±50°, the viewing angle can be adjusted to be within ±50°.

The mirror angle (reflection angle) may be changed at every position at an angle such that the reflected light projected from the projector 200 achieves maximum brightness as viewed by the observer.

This application is a continuation of PCT Application No. PCT/JP2019/045863 filed on Nov. 22, 2019, which is based upon and claims the benefit of priority from Japanese Patent Application No. 2018-219889 filed on Nov. 26, 2018. The contents of those applications are incorporated herein by reference in their entireties.

REFERENCE SYMBOLS

10: first transparent substrate
11: second transparent substrate
32: first transparent layer
40: reflective layer
52: second transparent layer
60: transparent substrate
100: transparent screen
110: unit lens
$110_1$ to $110_9$: small lens
120: image projecting structure
200: projector
300: observer
400: windshield
500: dashboard

What is claimed is:

1. A reflective transparent screen comprising:
a first transparent layer having an irregular surface,
a reflective layer formed on the irregular surface, and
a second transparent layer formed on the irregular surface on which the reflective layer is formed, so as to fill irregularities,
the irregular surface of the first transparent layer having a slant angle in a first direction being within a range of from −44° to +44°, and a slant angle in a second direction perpendicular to the first direction being within a range of from −44° to +44°, the irregular surface being formed by random arrangement of unit lenses differing in shape in the first direction and in the second direction, the unit lenses being arranged so that the average interval is from 10 μm to 500 μm, and the irregular surface including a region in which the slant angles in the first direction and in the second direction respectively change stepwise or continuously, wherein the irregular surface has micro-irregularities with a scattering angle within ±50°.

2. The reflective transparent screen according to claim 1, wherein the irregular surface has a slant angle in the first direction within a range of from −35° to +40°, and a slant angle in the second direction within a range of from −18° to +40°.

3. The reflective transparent screen according to claim 1, wherein the unit lenses are arranged so that the average interval is from 10 μm to 50 μm.

4. The reflective transparent screen according to claim 1, wherein the irregular surface is formed by two-dimensional arrangement of the plurality of the unit lenses.

5. The reflective transparent screen according to claim 4, wherein the irregular surface is formed by two-dimensional arrangement of the plurality of the unit lenses in the first direction and in the second direction.

6. The reflective transparent screen according to claim 1, wherein the irregular surface has micro-irregularities with a scattering angle within ±20°.

7. The reflective transparent screen according to claim 1, wherein the arithmetic mean surface roughness Ra of the reflecting surface of the reflective layer is within a range of from 0.005 μm to 5 μm.

8. The reflective transparent screen according to claim 7, wherein the arithmetic mean surface roughness Ra of the micro-irregularities is within a range of from 0.005 μm to 5 μm.

9. The reflective transparent screen according to claim 1, wherein the first transparent layer is composed of a resin having a refractive index of at least 1.4, and the difference in the refractive index between the first transparent layer and the second transparent layer is at most 0.05.

10. The reflective transparent screen according to claim 1, wherein the reflective layer is formed of one metal element selected from Au, Ag, Cu, Al, Ni, Ti, Pd, Co, Si, Ta, W, Mo and Ge, an alloy containing two or more of such elements, or a material containing the oxide NbO or $SiO_2$ as the main component.

11. An image display system comprising the reflective transparent screen as defined in claim 1 and a projector to project an image on the reflective transparent screen, wherein the slant angles are changed so that the brightness of reflected light from the reflective transparent screen becomes maximum as viewed by an observer.

12. The reflective transparent screen according to claim 1, wherein the unit lenses are arranged on the whole region of the first transparent layer.

13. The reflective transparent screen according to claim 12, wherein the reflective layer is formed on the whole region of the unit lenses.

* * * * *